US012808413B2

(12) United States Patent
Jurek, Jr.

(10) Patent No.: US 12,808,413 B2
(45) Date of Patent: Nov. 24, 2026

(54) BRAKE BACKING PLATE ASSEMBLY

(71) Applicant: Dexter Axle Company LLC, Elkhart, IN (US)

(72) Inventor: John R. Jurek, Jr., Osceola, IN (US)

(73) Assignee: Dexter Axle Company LLC, Elkhart, IN (US)

( * ) Notice: Subject to any disclaimer, the term of this patent is extended or adjusted under 35 U.S.C. 154(b) by 210 days.

(21) Appl. No.: 18/788,878

(22) Filed: Jul. 30, 2024

(65) Prior Publication Data

US 2025/0347330 A1 Nov. 13, 2025

Related U.S. Application Data

(60) Provisional application No. 63/644,666, filed on May 9, 2024.

(51) Int. Cl.
*F16D 65/09* (2006.01)
*F16D 51/00* (2006.01)

(52) U.S. Cl.
CPC ........ *F16D 65/09* (2013.01); *F16D 2051/003* (2013.01)

(58) Field of Classification Search
CPC .......................... F16D 65/09; F16D 2051/003
USPC ........................................ 188/218 A, 218 R
See application file for complete search history.

(56) References Cited

U.S. PATENT DOCUMENTS 5,096,027 A * 3/1992 Kobayashi ............ F16D 65/091 188/328

OTHER PUBLICATIONS

Dexter, Installation Instructions shoe and Lining Kit for 10" × 2-1-1/4" or 12" × 2" NEV-R-ADJUST aand Manual Electric Brakes, www.dexteraxle.com, accessed Jul. 15, 2024, 2 pages.

* cited by examiner

*Primary Examiner* — Christopher P Schwartz
(74) *Attorney, Agent, or Firm* — McGarry Bair PC

(57) ABSTRACT

A brake backing plate assembly having a first plate and a second plate. The first plate includes a first portion in a first plane. The first portion defines an axle aperture and a plurality of mounting apertures located circumferentially about the axle aperture, where the plurality of mounting apertures each have a second diameter. A circular boundary is coaxial to the axle aperture and has a third diameter equal to the first diameter plus six times the second diameter. The first plate further includes a second portion in a second plane parallel to the first plane, wherein the second plane includes at least two protrusions that extend into the circular boundary.

20 Claims, 7 Drawing Sheets

BRAKE BACKING PLATE ASSEMBLY

CROSS REFERENCE TO RELATED APPLICATIONS

This application claims the benefit of U.S. Provisional Patent Application No. 63/644,666, filed on May 9, 2024, which is incorporated herein by reference in its entirety.

BACKGROUND

Contemporary approaches for towing trailed vehicles, such as trailers, caravans, campers, or recreational vehicles (RVs), by a towing vehicle, such as a truck or other suitable motor vehicle, include the use of brake systems or braking assemblies of various types, configurations, and designs. Such brake systems are provided in communication with the towing vehicle and configured for controlling brakes included with the trailed vehicle to be towed, itself. Trailed vehicles include a chassis or frame and at least one axle carrying at least one pair of wheels for supporting the chassis. A tongue extends from the chassis for coupling with the towing vehicle via a trailer hitch assembly. The brake system operably couples the towing vehicle with at least one of the axles of the trailed vehicle.

The brake system can include an electrical or hydraulic actuator signaled by the towing vehicle. The electrical or hydraulic actuator pushes or otherwise rotates a pair of brake shoes apart creating frictional forces between the shoes and a brake drum. The brake shoe torque reacts on the brake backing plate assembly resulting in friction at the brake drum.

BRIEF DESCRIPTION

An aspect of the present disclosure relates to a brake backing plate assembly comprising a first plate, the first plate comprising an axle aperture having a first diameter, a first portion in a first plane, the first portion defining the axle aperture and a plurality of mounting apertures located circumferentially about the axle aperture, wherein the plurality of mounting apertures have a second diameter, a circular boundary coaxial to the axle aperture having a third diameter, wherein the third diameter is equal to the first diameter plus six times the second diameter, a second portion in a second plane parallel to the first plane, wherein the second plane includes at least two protrusions that extend radially inward past the circular boundary; and a second plate mounted to the first plate, the second plate comprising a first wing and a second wing, wherein at least a portion of the first wing and at least portion of the second wing extend radially inward past the circular boundary.

DETAILED DESCRIPTION

A brake system for a trailer can include a brake backing plate assembly having a backing plate that receives a portion of the axle and is coupled (e.g., bolted) to an axle brake flange. The backing plate provides support for at least the actuator and movable brake shoes. The brake shoes can be rotatable or otherwise separated by one or portions of the actuator to contact a brake drum. The contact between the brake shoes and the drum can generate forces on the backing plate that could cause deflection. Aspects of the disclosure include a brake backing plate assembly adapted to, configured to, or otherwise enabled to strengthen the backing plate to reduce deflection under braking activity, such as, but not limited to, heavy braking. As used herein, braking activity can include, but is not limited to applying a frictional force to reduce the rotation speed of a wheel or generally applying a force that is ultimately in the opposite direction of the motion of the vehicle. Braking activity is a signal-based response. The signal that results in breaking activity can come from one or more trailer or vehicle sensors, from a user, or any combination thereof. For example, the breaking signal can be a braking demand from a user by actuation of the brake pedal. In another example, one or more sensors or detectors on the vehicle or, optionally, the trailer, can provide a braking signal. In yet another non-limiting example, the brake signal can include a signal indicative of the brake demand from the tow vehicle, either from sensors on the tow vehicle or originating from a user. In response to receiving the braking signal, the braking system is actuated and slows the rotation of the wheel relative to a brake backing plate of the braking system. While aspects of the disclosure are described as a brake system for a trailer, the brake system can be for any type of wheeled vehicle.

Figure 1:
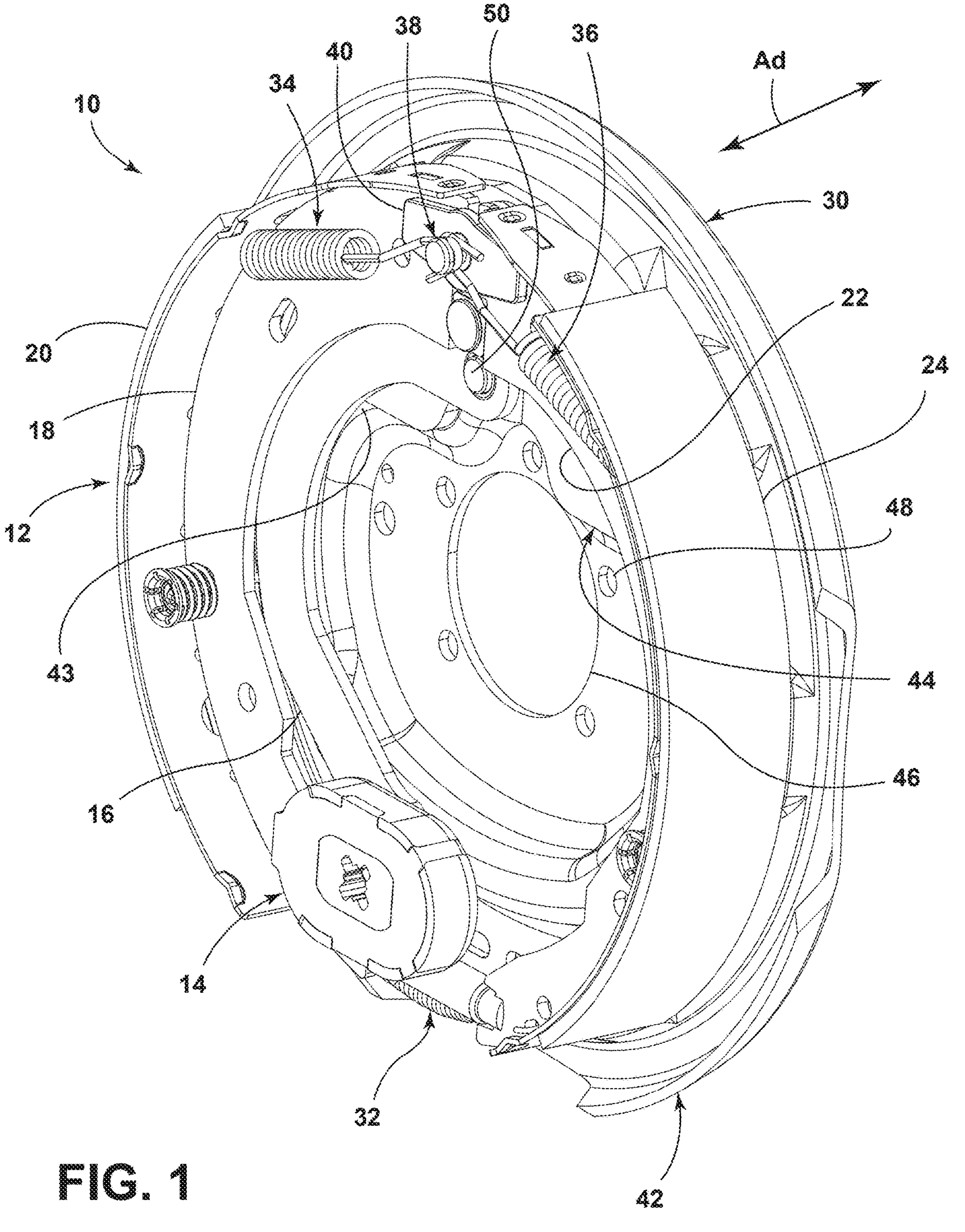
FIG. 1 is a perspective view of an outboard side of a brake system having a brake backing plate assembly.

FIG. 1 illustrates a brake system 10 as viewed from an outboard side 12. The outboard side 12 is the side facing a user when the brake system 10 is installed on an axle. The brake system 10 includes an actuator device 14 coupled to an actuator arm 16, a first shoe web 18 coupled to a first brake shoe 20, a second shoe web 22 coupled to a second brake shoe 24, and a brake backing plate assembly 30. The brake system 10 further includes a brake adjuster assembly 32 and return springs 34, 36. By way of non-limiting example, the brake system 10 can be a 12-inch by 2-inch (approximately 30.5 centimeters by 5.1 centimeters) brake system. That is, the brake system 10 can have a 12 inch diameter in a radial and 2 inches of width in an axial direction Ad.

An anchor, illustrated as an anchor post 38, extends through the brake backing plate assembly 30 and an anchor post washer 40. The first shoe web 18 and the second shoe web 22 are located between the anchor post washer 40 and the brake backing plate assembly 30, where the first shoe web 18 and the second shoe web 22 can freely engage the anchor post 38. The return springs 34, 36 can couple the first shoe web 18 and the second shoe web 22 to the anchor post 38.

The brake backing plate assembly 30 includes a first plate 42, illustrated as a backing plate (e.g., contoured or stamped backing plate), and a second plate 44, illustrated as an outboard reinforcement plate, coupled at an outward face 43 to the first plate 42. The first plate 42 defines an axle aperture 46. A plurality of mounting apertures 48 are located circumferentially about the axle aperture 46. The location of the plurality of mounting apertures 48 are determined by common industry dimensions. By way of non-limiting example, there can be five mounting apertures in the plurality of mounting apertures 48 where the spacing between the center of two lower mounting apertures can be 3 inches, while the spacing between the centers of all remaining mounting apertures is 2.125 inches. The second plate 44 couples to the first plate 42 and is located between the first plate 42 and the actuator arm 16.

In operation, a brake drum can (not shown) couple to the brake system 10, circumscribing at least the first brake shoe 20 and the second brake shoe 24. The brake system 10 and drum can be mounted to an axle assembly having an axle and axle brake flanges. A portion of an axle is received at the axle aperture 46 of the brake system 10. The brake system 10 can couple to an axle brake flange using fasteners that extend through the plurality of mounting apertures 48 of the brake system 10 and the axle brake flange of the axle assembly. The actuator device 14 of the brake system 10 is brought into communication with a tow vehicle.

The brake system 10 can respond to a breaking signal for engaging or actuating the brake system 10 to slow the trailer or vehicle. That is, the actuator device 14 receives a signal from the tow vehicle and moves or rotates the first shoe web 18 about, for example, a pivot 50, with the first brake shoe 20 and the second shoe web 22. The rotation can be caused by the actuator arm 16. The rotation or movement of the first brake shoe 20 and the second brake shoe 24 brings the first brake shoe 20 and the second brake shoe 24 into contact with the brake drum. The brake backing plate assembly 30 experiences increased force during braking activity via the anchor post 38 and the pivot 50 which supports the rotating the first shoe web 18, the second shoe web 22, and the actuator arm 16 throughout rotation or movement. Additionally, or alternatively, tension forces increased during braking by the return springs 34, 36 can be transferred to at least the first plate 42 by the anchor post 38.

In other words, movement of the actuator arm 16, the first shoe web 18, and the second shoe web 22 such that a frictional force is applied between the first brake shoe 20 and the second brake shoe 24, can result in increased forces on the anchor post 38, the pivot 50, or both which are then transferred to at least the first plate 42 of the brake backing plate assembly 30. However, the design of the first plate 42 and the second plate 44 reduce or eliminate deflection of the first plate 42 when the brake system 10 is actuated by the tow vehicle where forces are translated to the brake backing plate assembly 30 by at least the anchor post 38 and the pivot 50.

Using the brake backing plate assembly 30 in the brake system 10 results in a deflection of the first plate 42 towards the outboard side 12, or an inboard side 52 (FIG. 2), or combination thereof is less than 0.035 inches (approximately 0.89 millimeters) when a braking force of within 10% of 30,000 inch-pounds (approximately 3390 Newton-meters) is applied.

During or after repeated actuation or use of the brake system 10, the brake adjuster assembly 32 can adjust tension between one or more of the first shoe web 18 and/or the second shoe web 22 to maintain the feel of the brake system 10. The brake system 10 is illustrated, by way of example, an electric brake system, however it is contemplated that the brake system can be hydraulic brake system.

Figure 2:
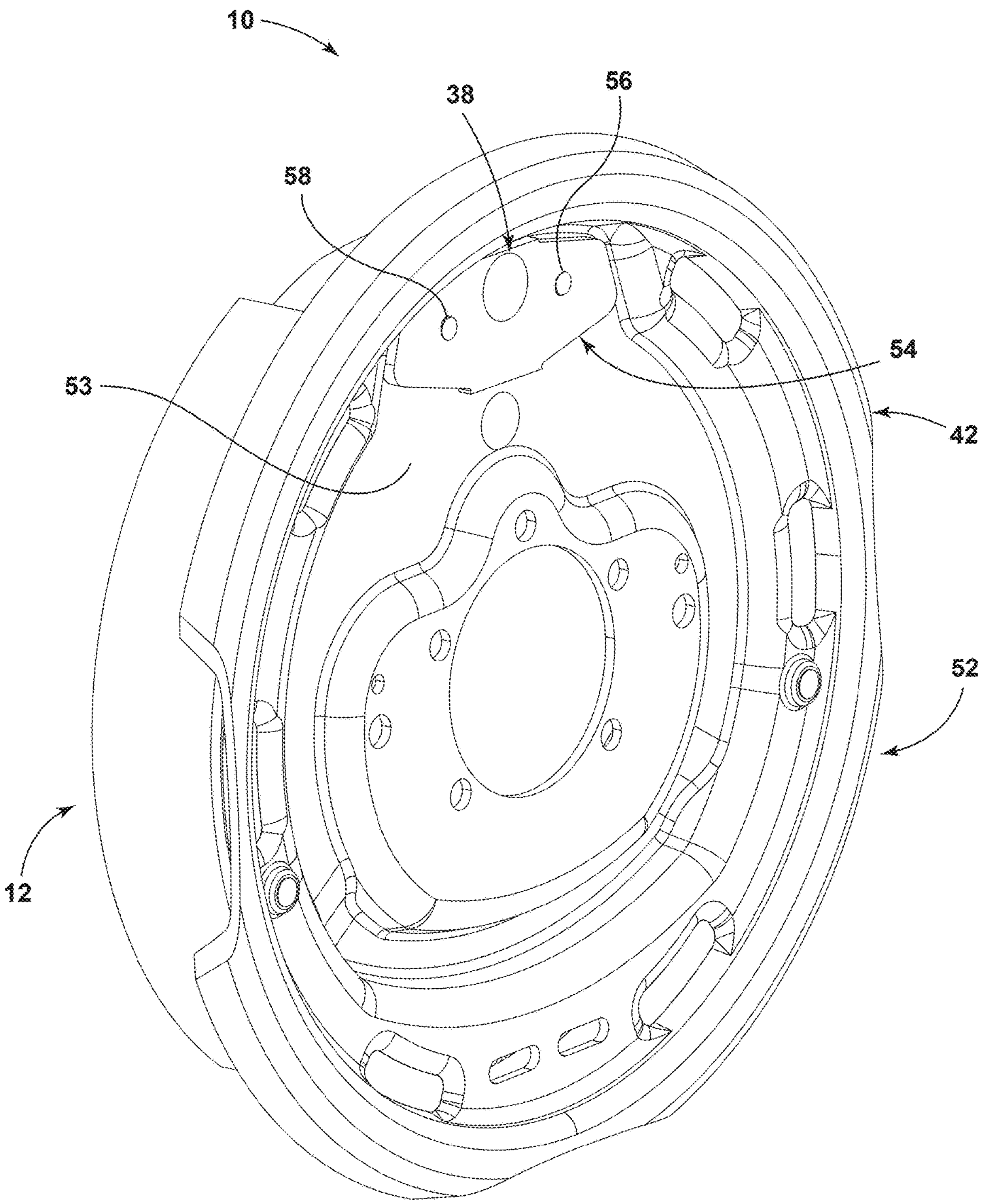
FIG. 2 is a perspective view of an inboard side of the brake system of FIG. 1 further illustrating the brake backing plate assembly.

FIG. 2 illustrates a brake system 10 as viewed from an inboard side 52 opposite of the outboard side 12. That is, the inboard side 52, when the brake system 10 is installed, faces underneath the trailer. The brake backing plate assembly 30 further includes a third plate 54 illustrated as an inboard reinforcement plate. The third plate 54 couples to the first plate 42 at an inward face 53 coupled to the first plate 42 by the anchor post 38. At least two fasteners (e.g., rivets), illustrated as rivets 56, 58 can couple the third plate 54 and the second plate 44 (FIG. 1) to the first plate 42 as further illustrated in FIG. 3.

Figure 3:
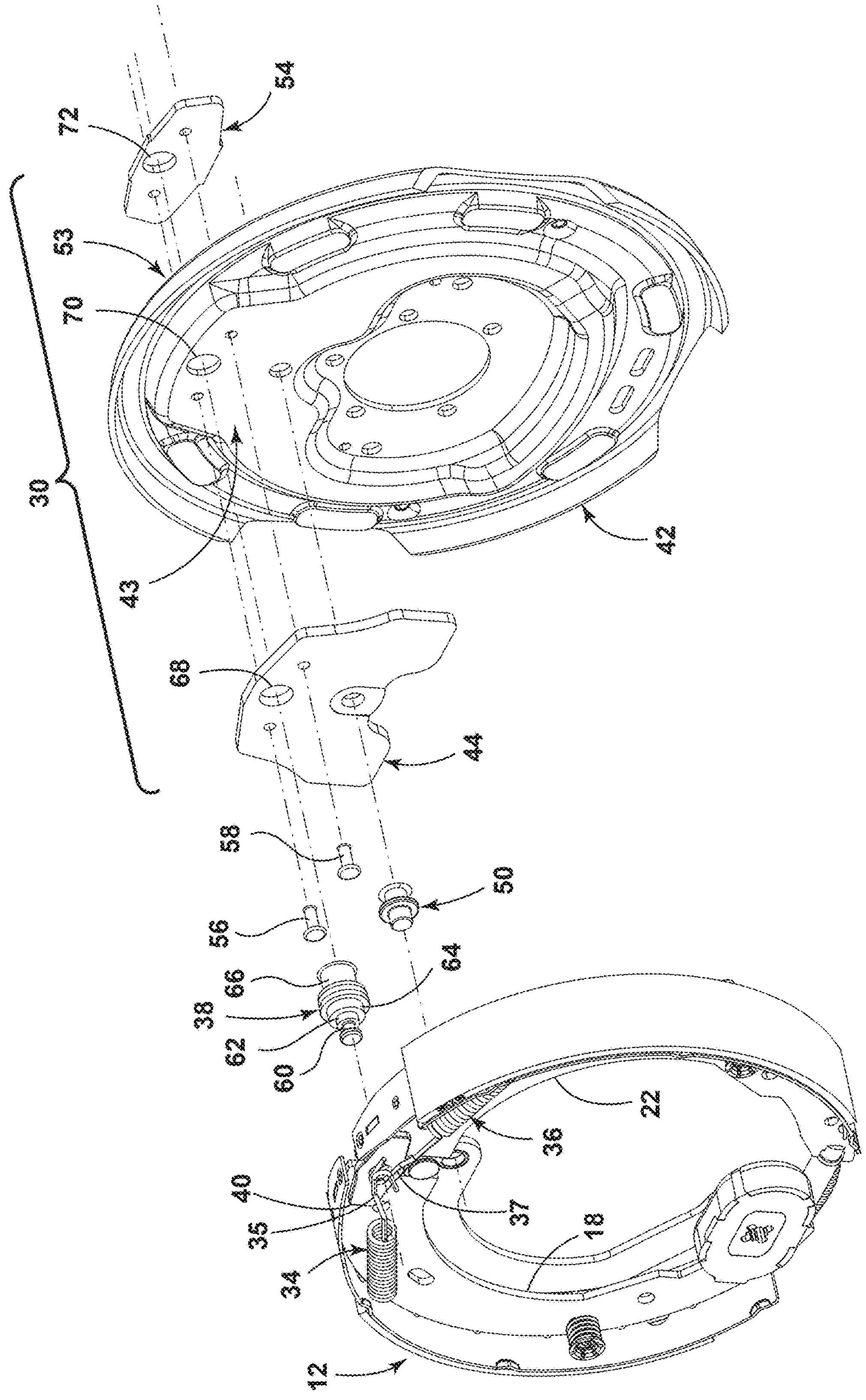
FIG. 3 is a partially exploded view of the brake system of FIG. 1.

FIG. 3 illustrates the brake system 10 partially exploded. The return springs 34, 36 include hooks 35, 37 that couple or clip to a first receiving portion 60 of the anchor 38. The anchor post washer 40 mounts to a second receiving portion 62 of the anchor post 38. A third receiving portion 64 can at least partially contact the first shoe web 18, the second shoe web 22, or portions of both the first shoe web 18 and the second shoe web 22.

A fourth receiving portion 66 of the anchor post 38 is received by the second plate 44, the first plate 42, and the third plate 54 at anchor apertures 68, 70, 72. Additionally, the rivets 56, 58 couple the first plate 42, the second plate 44, and the third plate 54 of the brake backing plate assembly 30.

When assembled, the first plate 42 is located between the second plate 44 and the third plate 54. That is, the second plate 44 is mounted to the outward face 43 of the first plate 42 and the third plate 54 is mounted to the inward face 53 of the first plate 42. A mounting surface area for the second plate 44 is defined as the surface area of the second plate 44 that contacts the outward face 43 of the first plate 42 when the second plate 44 is coupled to the first plate 42. A mounting surface area for the third plate 54 is defined as the surface area of the third plate 54 that contact the inward face 53 of the first plate 42 with the third plate 54 is coupled to the first plate 42.

The mounting surface area for the third plate 54 is less than the mounting surface area for the second plate 44. By way of non-limiting example a ratio of the mounting surface area for the third plate 54 to the mounting surface area for the second plate 44 is in a range from 1:5 to 1:2.

Figure 4:
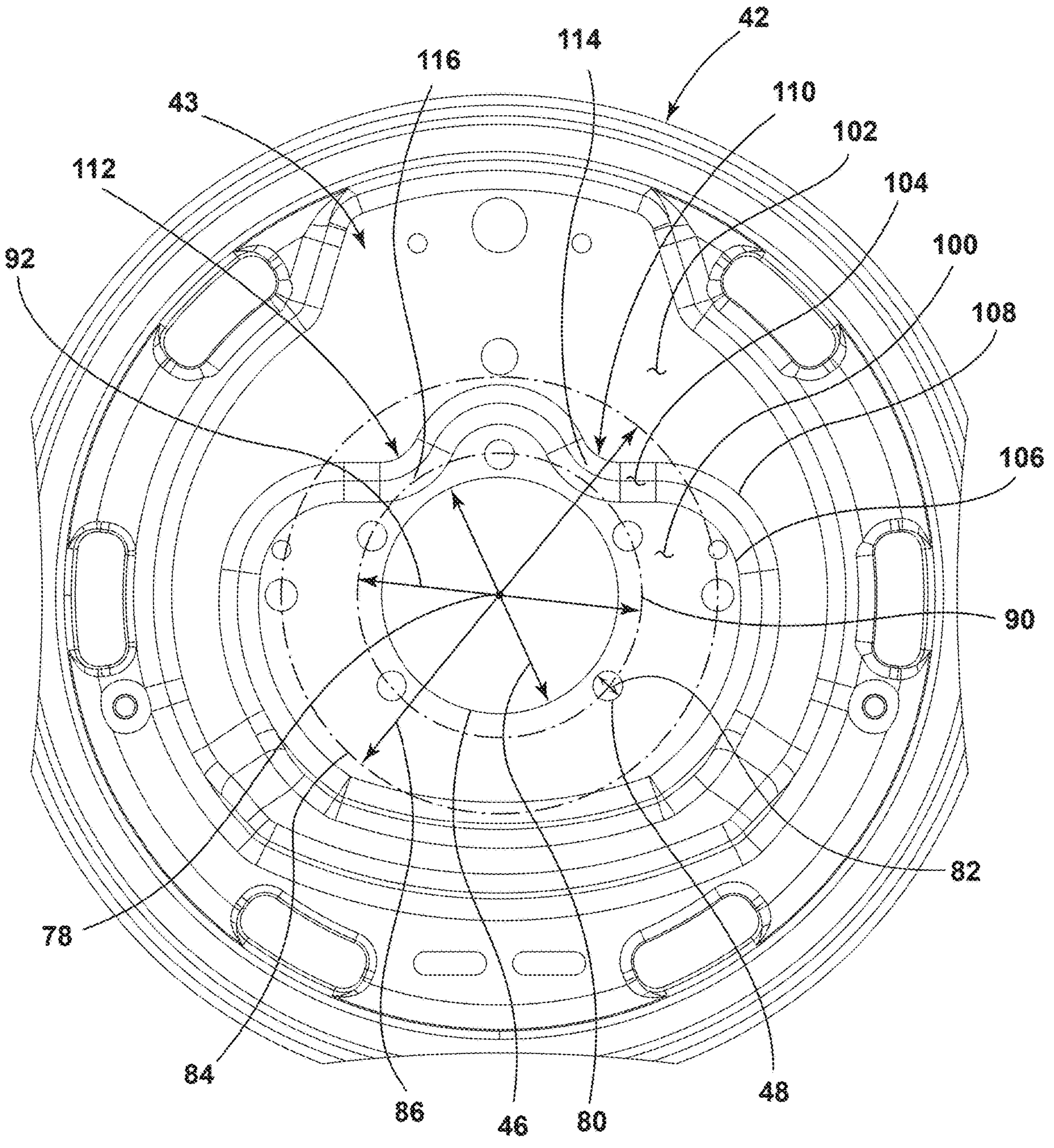
FIG. 4 is a front view of a first plate of the brake backing plate assembly of FIG. 3.

FIG. 4 is a front view of the first plate 42 as viewed from the outward face 43. An axle shaft axis 78 can be defined as into and out of the page at the center of the axle aperture 46. The axle aperture 46 has a first diameter 80. The first diameter 80 can be a standard diameter known to accept previously manufactured axles. By way of non-limiting example, the first diameter 80 can be in a range from 3.250 inches to 3.255 inches (approximately 8.255 centimeters to 8.268 centimeters).

Each mounting aperture of the plurality of mounting apertures 48 has a second diameter 82. The second diameter 82, for example, can be in a range of 0.405 inches to 0.410 inches (approximately 1.02 centimeters to 1.04 centimeters). While illustrated, by way of example, as including five mounting apertures, the plurality of mounting apertures 48 that circumscribe the axle aperture 46 can include, for example, four, six, or eight of mounting apertures. That is, any number of mounting apertures are contemplated. It is further contemplated that the second diameter can change based on the number of mounting apertures.

A first circular boundary 84 can be coaxial to the axle aperture 46. That is, the first circular boundary 84 can be centered on the axle shaft axis 78. The first circular boundary 84 has a third diameter 86. The third diameter 86 can be equal to the first diameter 80 plus six times the second diameter 82. A second circular boundary 90 can be defined coaxially to the first circular boundary 84 or the axle aperture 46. The second circular boundary 90 has a fourth diameter 92 less than the third diameter 86. By way of non-limiting example, the fourth diameter 92 can be less than or equal to the first diameter 80 plus four times the second diameter 82. By way of further non-limiting example, the fourth diameter 92 can be defined by twice the distance from the axle shaft axis 78 to the center of a mounting aperture of the plurality of mounting apertures 48.

The first plate 42 can include a first portion 100 that defines at least the axle aperture 46 and the plurality of mounting apertures 48. The first plate 42 can further include a second portion 102 coupled to the first portion 100 by a contoured region 104. The contoured region 104 is defined from a first boundary 106 defined by the first portion 100 and a second boundary 108 defined by the second portion 102. The second portion 102 of the first plate 42 defines the anchor aperture 70.

The second portion 102 includes at least two protrusions illustrated as a first protrusion 110 and a second protrusion 112. The first protrusion 110 and the second protrusion 112 extend radially toward the axle shaft axis 78 so that the first protrusion 110 and the second protrusion 112 overlap, be located, or extend into the first circular boundary 84.

At least a portion 114 of the contoured region 104 between the first protrusion 110 and the axle aperture 46 or the second protrusion 112 and the axle aperture 46 can overlap, be located, or extend within the first circular boundary 84. Further, at least a portion 116 of the contoured region 104 between the first protrusion 110 and the axle aperture 46 or the second protrusion 112 and the axle aperture 46 can overlap, be located, or extend within the second circular boundary 90. It is contemplated that at least portion of the contoured region 104 is within 2 inches (approximately 5 centimeters) or less of the axle shaft axis 78.

Figure 5:
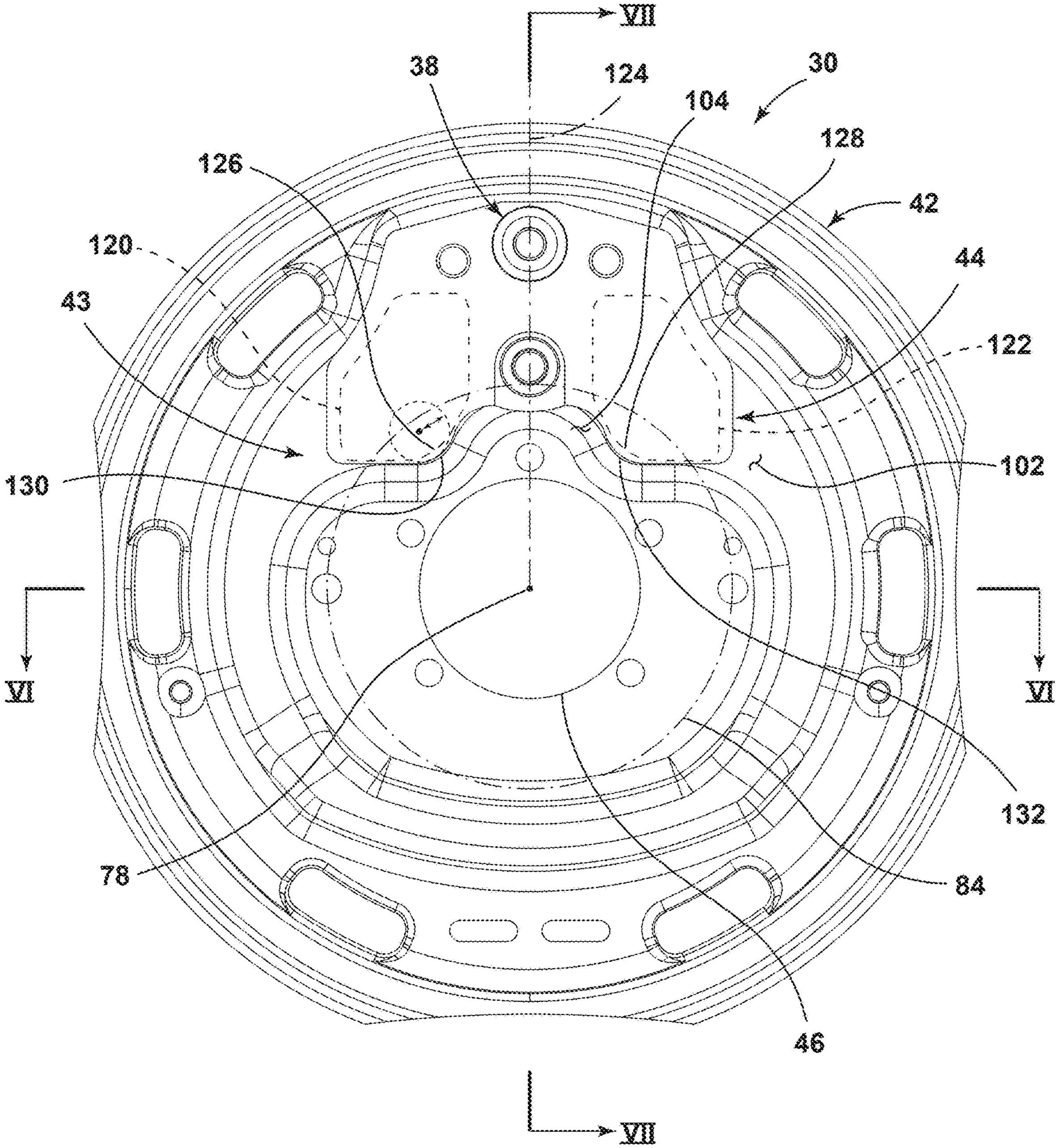
FIG. 5 is front view of the brake backing plate assembly of FIG. 1.

FIG. 5 is a front view of the brake backing plate assembly 30 further illustrating the second plate 44 mounted to the outward face 43 of the first plate 42. The second plate 44 includes a first wing 120 and a second wing 122 illustrated by dotted portions. The dotted portion are located on either side of a centerline 124. The first wing 120, the second wing 122, or both can contain or include more or less of the second plate 44 than illustrated. That is, the first wing 120, the second wing 122, or both can include more or less of the edges or portions of the perimeter of the second plate 44.

At least a portion of the first wing 120 and at least portion of the second wing 122 is located within, overlaps, or extends into the first circular boundary 84. For example, at least a portion of the first wing 120 and at least portion of the second wing 122 is within three inches of the axle shaft axis 78.

The portion of the first wing 120 that extends into the first circular boundary 84 includes a first nose 126. Similarly, the second wing 122 includes a second nose 128. The first nose 126 and the second nose 128 can have a radius of curvature in a range from 0.5 inches to 1.25 inches (approximately 1.27 centimeters to 3.18 centimeters).

The portion of the second portion 102 of the first plate 42 that extends into the first circular boundary 84 can include a first plate nose 130 and a second plate nose 132. As illustrated, by way of example, the first nose 126 of the first wing 120 corresponds to or is located adjacent the first plate nose 130. The second nose 128 of the second wing 122 is corresponds to or is located adjacent the second plate nose 132. Similarly, the first plate nose 130 and the second plate nose 132 can have a radius of curvature in a range from 0.5 inches to 1.25 inches (approximately 1.27 centimeters to 3.18 centimeters). For example, the first plate nose 130 and the second plate nose 132 can have a radius of curvature in a range from 1.10 inches to 1.12 inches (approximately 2.79 centimeters to 2.84 centimeters). As used herein, the term "adjacent" is defined as a distance between two objects that is less than or equal the second diameter 82.

While illustrated as having the same radius of curvature, it is contemplated that the radius of curvature of the first nose 126 and the second nose 128 can be different than the first plate nose 130 and the second plate nose 132.

The second portion 102 of the first plate 42 can have a total surface area. A ratio of the mounting surface area of the second plate 44 to the total surface area of the second portion 102 of the first plate 42 is in a range from 1:2.5 to 1:1. That is, at least 40% of the total surface area of the second portion 102 is in contact with the second plate 44. This provides a reduction in deflection. For example, the ratio of the mounting surface area of the second plate 44 to the total surface area of the second portion 102 of the first plate 42 can be in a range from 3:5 to 4:5. That is, between 60% and 80% of the total surface area of the second portion 102 is in contact with the second plate 44. The benefits of this range provide significant reduction in deflection during heavy braking. Additional benefits of this range include a decrease in cost over alterative reinforcing concepts, such as thickening the first plate 42.

Figure 6:
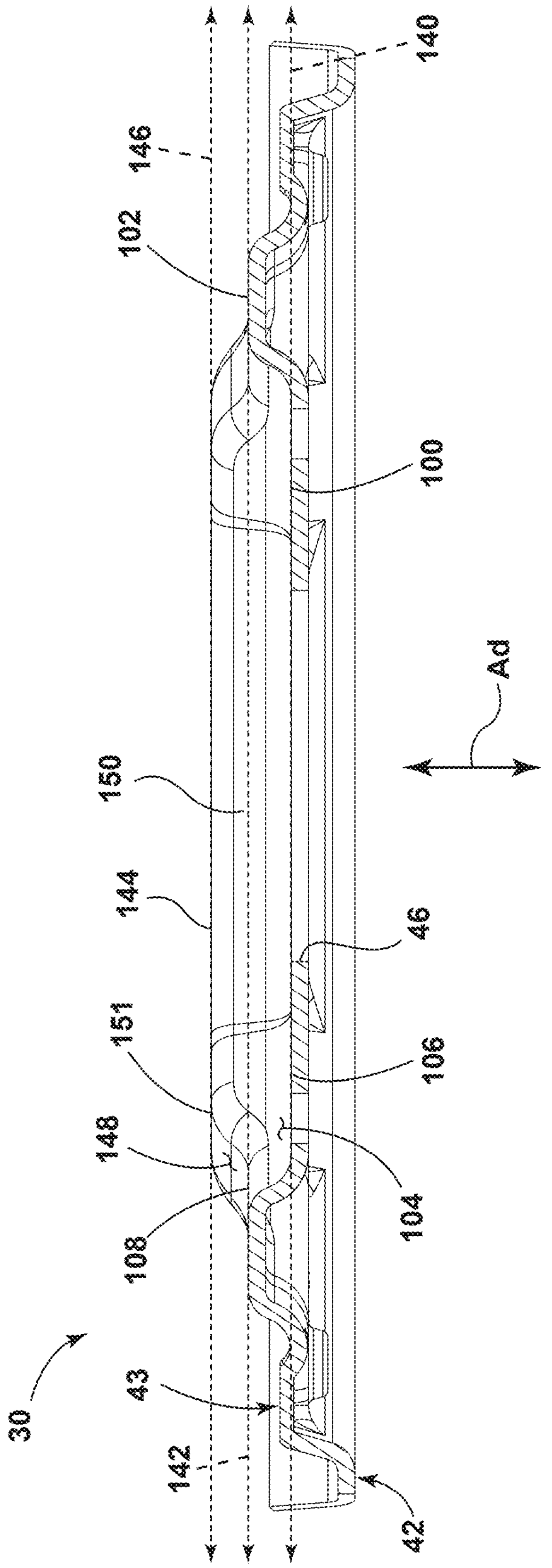
FIG. 6 is a cross-sectional view of a portion of the brake backing plate assembly, taken along line VI-VI of FIG. 5.

FIG. 6 is a cross section of the brake backing plate assembly 30 of FIG. 5 taken at line VI-VI. The first plate 42 includes the second portion 102 coupled to the first portion 100 by the contoured region 104. The contoured region 104 is extends from the first boundary 106 defined by the first portion 100 to the second boundary 108 defined by the second portion 102. Optionally, the contoured region 104 can include a portion 150 that extends axially from the first boundary 106 defined by the first portion 100 in the first plane 140, past the second plane 142, to an extended boundary 151 defined by the third portion 144 in the third plane 146.

The first portion 100 of the first plate 42 that defines the axle aperture 46 is in a first plane 140. The first plane 140 is illustrated as a line indicating a first dimension with it being understood that the second dimension of the first plane 140 is into and out of the page. The second portion 102 of the first plate 42 is in a second plane 142, where the second plane 142 is parallel to the first plane 140. The term "parallel" refers to generally parallel, where first and second lines or planes extend such that a third line can be drawn that crosses the first and second lines or planes, wherein the third line is in a range of 80 degrees to 100 degrees to both the first line and the second line.

The first plane 140 is spaced in the axial direction Ad from the second plane 142. Similar to the first plane 140, the second plane 142 has a second dimension into and out of the page.

The first plate 42 also includes a third portion 144 in a third plane 146. The third plane 146 can be parallel to the first plane 140 or the second plane 142. The third plane 146 is axially spaced from the first plane 140 and the second plane 142. Similar to the first plane 140 and the second plane 142, the third plane 146 has a second dimension into and out of the page.

A transition region 148 is defined as a portion of the first plate 42 that axially extends between the second portion 102 in the second plane 142 to the third portion 144 in the third plane 146. The contoured region 104 includes the portion 150 that extends axially from the first portion 100 in the first plane 140, past the second plane 142, to the third portion 144 in the third plane 146.

Figure 7:
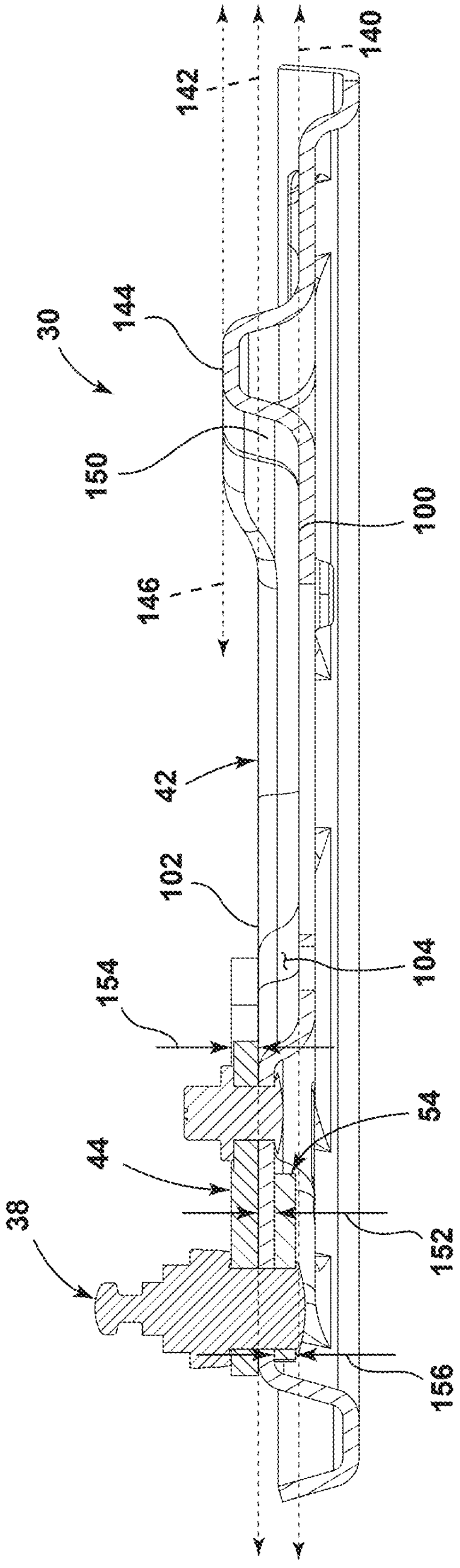
FIG. 7 is a cross-sectional view of a portion of the brake backing plate assembly, taken along line VII-VII of FIG. 5.

FIG. 7 is a perspective view of the cross-section of FIG. 5 taken at the VII-VII line. The contoured region 104 is defined as a part of the first plate 42 extending from the first portion 100 in the first plane 140 to the second portion 102 in the second plane 142. As previously describe, the contoured region 104 can include the portion 150 that extends from the first portion 100 in the first plane 140 to the third portion 144 in the third plane 146.

The first plate 42, the second plate 44, and the third plate 54 are coupled by the anchor post 38. The first plate 42 has a first thickness 152. The first thickness 152 can be measured at the second portion 102 where the first plate 42 contacts one of the second plate 44 or the third plate 54. By way of non-limiting example, the first thickness 152 can be in a range from 0.14 inches to 0.18 inches (approximately 0.35 centimeters to 0.46 centimeters). For example, the first thickness 152 can be in a range from 0.1425 inches to 0.1565 inches (approximately 3.62 millimeters to 3.98 millimeters).

The second plate 44 has a second thickness 154. The second thickness 154 can be greater than the first thickness 152. Alternatively, the second thickness 154 can be equal to the first thickness 152.

The third plate 54 has a third thickness 156. The third thickness 156 can be equal to the first thickness 152. Alternatively, the third thickness 156 can be less than or greater than the first thickness 152.

It was discovered, unexpectedly, during the course of the brake system design and the time-consuming iterative process previously described, that a relationship exists between the wings of the second plate and the protrusions of the first plate.

At first, inventors looked to known solutions to strengthen the backing plate, illustrated as the first plate. Increasing thickness of the backing plate would improve the strength of the backing plate and decreases deflection of the backing plate during breaking. However, this obvious solution increased the cost of the backing plate and could require possible redesign of other elements to accommodate the thicker backing plate. Therefore, increasing the thickness of the backing plate is not a desirable solution. This led inventors to take a less obvious approach. The inventors changed the surface area of the first portion and the second portion; increasing the surface area of the second portion with protrusions that extended towards the axle shaft axis. The protrusions were meticulously explored and the resulting design increases the strength of the backing plate while not interfering with mounting the backing plate to the standard sized axle brake flange using the plurality of mounting apertures. Additionally, the inventors altered the shape of the second plate, providing wings on the second plate, where the wings extend via a rounded nose towards the axle shaft axis. The careful ratio of the surface area of the second portion of the first plate to the surface area of the second plate provided the surprising result of decreasing deflection as much or more than thickening the backing plate. Inventors further noted significant benefit in changing the surface area of the third plate.

Therefore, features and configuration of the brake backing plate assembly as disclosed herein, provides the benefit and technical effect of decreasing deflection of the backing plate or first plate, when the brake system is actuated; even under heavy braking. When compared with a conventional or traditional design, the finite element analysis (FEA) indicated a 42% reduction in deflection using the brake backing plate assembly described herein. Heavy braking, is used herein, can indicate 12 volts at 30 MPH; resulting in a braking torque with 10% of 30,000 inch-pounds (approximately 3390 Newton-meters).

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

The invention claimed is:

1. A brake backing plate assembly comprising:
- a first plate comprising:
  - an axle aperture having a first diameter;
  - a first portion in a first plane, the first portion defining the axle aperture and a plurality of mounting apertures located circumferentially about the axle aperture, wherein the plurality of mounting apertures have a second diameter;
  - a circular boundary coaxial to the axle aperture having a third diameter, wherein the third diameter is equal to the first diameter plus six times the second diameter;
  - a second portion in a second plane parallel to the first plane, wherein the second plane includes at least two protrusions that extend radially into the circular boundary; and
- a second plate mounted to the first plate, the second plate comprising a first wing and a second wing, wherein at least a portion of the first wing and at least a portion of the second wing extends into the circular boundary.

2. The brake backing plate assembly of claim 1, wherein the circular boundary is a first circular boundary, and a second circular boundary can be defined coaxially to the first circular boundary, wherein the second circular boundary has a fourth diameter less than the third diameter.

3. The brake backing plate assembly of claim 2, wherein the fourth diameter is less than or equal to the first diameter plus four times the second diameter.

4. The brake backing plate assembly of claim 2, further comprising a contoured region extending between at least the first portion in the first plane and the second portion in the second plane, wherein at least a portion of the contoured region extends radially into the second circular boundary.

5. The brake backing plate assembly of claim 1, wherein the first plate further comprises a third portion in a third plane.

6. The brake backing plate assembly of claim 5, wherein a transition region is defined as a portion of the first plate extending axially outward from the second portion in the second plane to the third portion in the third plane.

7. The brake backing plate assembly of claim 1, wherein the second plate is mounted to the first plate by at least two fasteners.

8. The brake backing plate assembly of claim 1, wherein the second portion includes an inward face and an outward face, wherein the second plate is mounted to the outward face to define a mounting surface area for the second plate.

9. The brake backing plate assembly of claim 8, wherein a ratio of the mounting surface area to a total surface area of the second portion is in a range from 1:2.5 to 1:1.

10. The brake backing plate assembly of claim 8, further comprising a third plate mounted to the inward face of the second portion to define a mounting surface area for the third plate.

11. The brake backing plate assembly of claim 10, wherein a ratio of the mounting surface area for the third plate to the mounting surface area for the second plate is in a range from 1:5 to 1:2.

12. The brake backing plate assembly of claim 1, wherein the at least two protrusions each include a plate nose, wherein the plate nose has a radius of curvature in a range from 0.5 inches to 1.25 inches (approximately 1.27 centimeters to 3.18 centimeters).

13. The brake backing plate assembly of claim 12, wherein the first wing or the second wing includes a nose, and wherein the nose has a radius of curvature in a range from 0.5 inches to 1.25 inches (approximately 1.27 centimeters to 3.18 centimeters).

14. The brake backing plate assembly of claim 1, wherein the first plate defines a first thickness and the second plate defines a second thickness, and wherein the second thickness is greater than the first thickness.

15. The brake backing plate assembly of claim 1, further comprising a third plate mounted to an inward face of the first plate, and wherein the second plate is mounted to an outward face of the first plate.

16. The brake backing plate assembly of claim 1, further comprising at least two rivets that extend through and couple the second portion of the first plate, the second plate, and a third plate.

17. The brake backing plate assembly of claim 1, wherein the first plate includes a contoured region defined as a portion of the first plate extending from the first portion in the first plane to the second portion in the second plane.

18. The brake backing plate assembly of claim 17, wherein the axle aperture defines an axle shaft axis and at least a portion of the contoured region is within 2 inches or less of the axle shaft axis.

19. The brake backing plate assembly of claim 1, wherein the plurality of mounting apertures includes five mounting apertures and the brake backing plate assembly is for a 12-inch by 2-inch (approximately 30.5 centimeters by 5.1 centimeters) brake system.

20. The brake backing plate assembly of claim 1, where upon a braking force of within 10% of 30,000 inch-pounds (approximately 3390 Newton-meters) results in a deflection of the first plate of less than 0.035 inches (approximately 0.89 millimeters).

* * * * *